(12) United States Patent
Anderson

(10) Patent No.: US 8,730,030 B2
(45) Date of Patent: May 20, 2014

(54) HAZARD/PERIMETER SAFETY SYSTEM

(75) Inventor: Preston L. Anderson, Cransberry, PA (US)

(73) Assignee: Honeywell International Inc., Morristown, NJ (US)

( * ) Notice: Subject to any disclaimer, the term of this patent is extended or adjusted under 35 U.S.C. 154(b) by 203 days.

(21) Appl. No.: 13/330,129

(22) Filed: Dec. 19, 2011

(65) Prior Publication Data

US 2013/0154825 A1 Jun. 20, 2013

(51) Int. Cl.
*G08B 1/08* (2006.01)

(52) U.S. Cl.
USPC ............... 340/539.11; 340/539.1; 340/541; 340/573.1; 340/564

(58) Field of Classification Search
USPC ............ 340/539.1, 435, 540, 541, 539.11, 340/573.1, 561, 564, 565
See application file for complete search history.

(56) References Cited

U.S. PATENT DOCUMENTS

| | | | | |
|---|---|---|---|---|
| 5,939,986 A | * | 8/1999 | Schiffbauer et al. | 340/573.1 |
| 6,963,278 B2 | * | 11/2005 | Frame | 340/539.22 |
| 7,088,284 B2 | * | 8/2006 | Young | 342/27 |
| 7,518,522 B2 | * | 4/2009 | So | 340/573.3 |
| 8,446,277 B2 | * | 5/2013 | Frederick | 340/539.23 |

\* cited by examiner

*Primary Examiner* — Toan N Pham
(74) *Attorney, Agent, or Firm* — Wood, Phillips, Katz, Clark & Mortimer

(57) ABSTRACT

A method and system (10) are provided for preventing accidental intrusion into a hazardous area (12) at a worksite (14). The system (10) includes a transmitter (16), a signal wire (18) connected to the transmitter (16) to emit a wireless signal (19) driven by the transmitter (16), with the signal wire (18) configured for placement between the hazardous area (12) and a nonhazardous area (22) at the worksite (14), a sensor (24) configured to be carried on a person (28) at the worksite (14) and to sense the wireless signal (19) from the signal wire (18) when the sensor (24) is within a predetermined distance from the signal wire 18, and at least one alerting device (30) operably associated with the sensor (24) to generate an alert to the person (28) carrying the sensor (24) in response to the sensor (24) sensing the wireless signal (19).

20 Claims, 2 Drawing Sheets

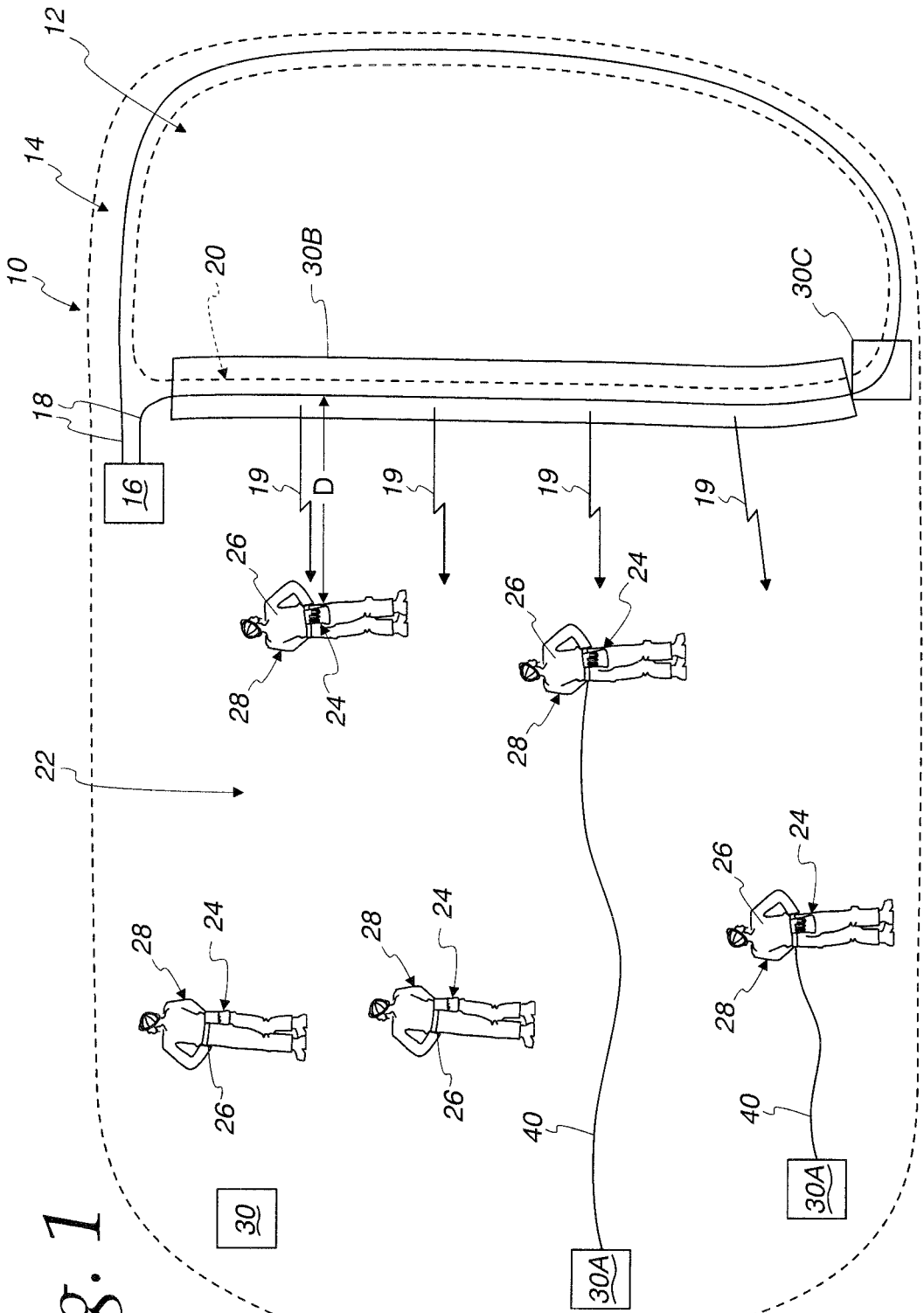

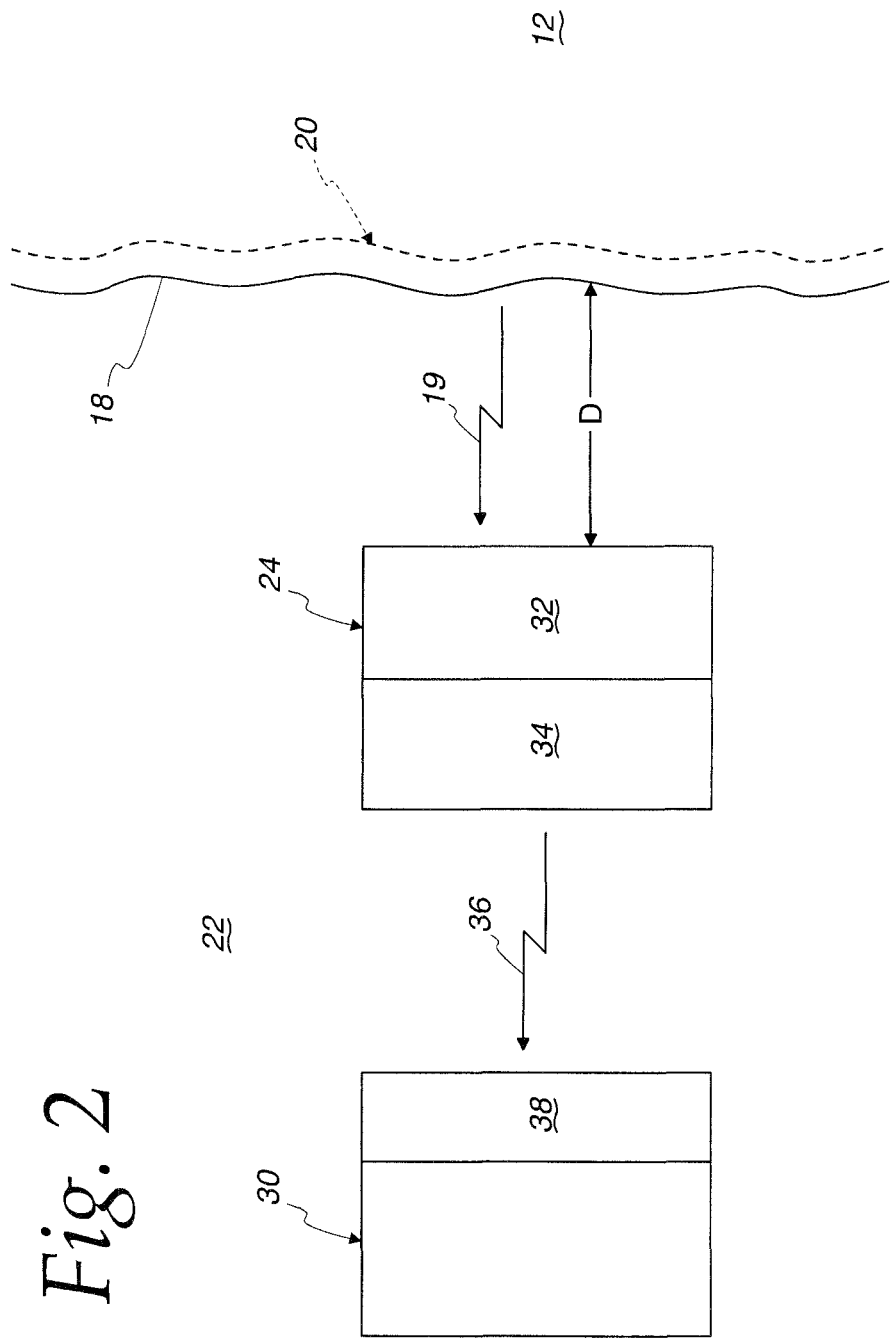

HAZARD/PERIMETER SAFETY SYSTEM

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD

This invention relates to worksites having restricted or hazardous areas, such as a worksite on a roof or an elevated platform, and to systems and methods of preventing workers at such worksites from inadvertently entering the hazardous area associated with the worksite.

BACKGROUND

Some worksites involve restricted or hazardous areas that can be inadvertently entered into by workers or other personnel at the worksite who are distracted or perhaps unaware of the restricted/hazardous area. Examples of such worksites include elevated platforms, roofs, worksites with a pit, open hole, or other excavation, worksites adjacent overhead hazards, such as worksites adjacent an elevated worksite, and worksites adjacent electrical, chemical, biological, or radioactive hazards. Current technology involves erecting a physical barrier to prevent inadvertent entry into a hazardous/restricted area at a worksite.

SUMMARY

In accordance with one feature of the application, a method is provided for preventing accidental intrusions into a hazardous area at a worksite. The method includes the steps of placing a signal wire between a non-hazardous area and a hazardous area at a worksite, sensing a signal from the signal wire with a wireless receiver carried on a person at the worksite when the wireless receiver is within a predetermined distance from the signal wire, and automatically alerting the person that they are about to intrude into the hazardous area in response to the signal sensed by the wireless receiver.

In one feature, the step of automatically alerting the person includes restraining the person against further movement toward the hazardous area. As one further feature, the restraining step includes automatically activating a self retracting lifeline to resist further deployment a lifeline attached to the person. As another further feature, the restraining step includes automatically raising a barrier between the non-hazardous area and the hazardous area.

According to one feature, the step of automatically alerting the person includes generating an audio signal to the person.

As one feature, the step of automatically alerting the person includes generating a tactile signal to the person.

In one feature, the step of automatically alerting the person includes generating a visual signal to the person. As a further feature, the step of generating a visual signal includes illuminating warning lights positioned between the non-hazardous area and the hazardous area.

According to one feature, the automatically alerting step includes generating a wireless alert signal to a fixed position alerting device responsive to the wireless alert signal.

As one feature, the method further includes the step of providing a wireless receiver to each person at the worksite, each of the wireless receivers capable of sensing a signal from the signal wire when the wireless receiver is within a predetermined distance from the signal wire.

In accordance with one feature of the application, a system is provided for preventing accidental intrusions into a hazardous area at a worksite. The system includes a transmitter; a signal wire connectable to the transmitter to emit a wireless signal driven by the transmitter, the signal wire configured for placement between a non-hazardous area and a hazardous area at a worksite; a portable sensors configured to be carried on the body of a person at the worksite and to sense the wireless signal from the signal wire when the sensor is within a predetermined distance from the signal wire with the signal wire placed between a non-hazardous area and a hazardous area at a worksite; and an alerting device operably associated with the sensor to generate an alert to a person carrying the sensor in response to the sensor sensing the wireless signal from the signal wire when the sensor is within a predetermined distance from the signal wire with the signal wire placed between a non-hazardous area and a hazardous area at a worksite, the alerting device configured to be positioned at the worksite independent from the sensor.

As one feature, the system further includes a plurality of portable sensors, each sensor capable of sensing the wireless signal from the signal wire when the sensor is within a predetermined distance from the signal wire with the signal wire placed between a non-hazardous area and a hazardous area at a worksite; each sensor configured to be carried on the body of a person at the worksite; and wherein the alerting device is operably associated with each of the sensors to generate an alert to any person carrying one of the sensors in response to the sensor sensing the wireless signal from the signal wire when the sensor is within a predetermined distance from the signal wire with the signal wire placed between a non-hazardous area and a hazardous area at a worksite.

In one feature, the portable sensor includes a wireless receiver configured to sense the wireless signal from the signal wire when the sensor is within a predetermined distance from the signal wire with the signal wire placed between a non-hazardous area and a hazardous area at a worksite. As a further feature, the sensor further includes a wireless transmitter configured to transmit a wireless alert signal in response to the wireless receiver sensing the wireless signal from the signal wire when the sensor is within a predetermined distance from the signal wire with the signal wire placed between a non-hazardous area and a hazardous area at a worksite. As yet a further feature, the alerting device includes a wireless receiver configured to sense the wireless alert signal from the sensor.

According to one feature, the alerting device includes a self retracting lifeline configured to resist further deployment of a lifeline in response to the sensor sensing the wireless signal from the signal wire when the sensor is within a predetermined distance from the signal wire with the signal wire placed between a non-hazardous area and a hazardous area at a worksite.

In one feature, the alerting device includes a barrier movable from a position allowing intrusion into the hazardous area to a position inhibiting intrusion into the hazardous area in response to any of the sensors sensing the wireless signal from the signal wire when the sensor is within a predetermined distance from the signal wire with the signal wire placed between a non-hazardous area and a hazardous area at a worksite.

As one feature, the alerting device includes warning lights configured to be stationed between the non-hazardous area and the hazardous area and to illuminate in response to any of the sensors sensing the wireless signal from the signal wire when the sensor is within a predetermined distance from the signal wire with the signal wire placed between a non-hazardous area and a hazardous area at a worksite.

In one feature, the alerting device is configured to generate an audio signal in response to any of the sensors sensing the wireless signal from the signal wire when the sensor is within a predetermined distance from the signal wire with the signal wire placed between a non-hazardous area and a hazardous area at a worksite.

According to one feature, the alerting device is configured to generate a visual signal in response to any of the sensors sensing the wireless signal from the signal wire when the sensor is within a predetermined distance from the signal wire with the signal wire placed between a non-hazardous area and a hazardous area at a worksite.

As one feature, the alerting device is configured to generate a tactile signal in response to any of the sensors sensing the wireless signal from the signal wire when the sensor is within a predetermined distance from the signal wire with the signal wire placed between a non-hazardous area and a hazardous area at a worksite.

Other features and advantages will become apparent from a review of the entire specification, including the appended claims and drawings.

BRIEF DESCRIPTION OF THE DRAWINGS

FIG. 1 is a diagrammatic representation of a system according to the application for preventing accidental intrusions into a hazardous area at a worksite; and FIG. 2 is a diagrammatic representation of a signal wire, a sensor and an alerting device for use in the system of FIG. 1.

DETAILED DESCRIPTION

A system 10 for preventing accidental intrusion into a hazardous area 12 at a worksite 14 is shown diagrammatically in FIG. 1. The system 10 includes a transmitter 16, a signal wire 18 connected to the transmitter 16 to emit a wireless signal (shown schematically at 19) driven by the transmitter 16, with the signal wire 18 configured for placement at a boundary 20 between the hazardous area 12 and a nonhazardous area 22 at the worksite 14. The system 10 further includes a sensor 24 configured to be carried on the body 26 of a person 28 at the worksite 14 and to sense the wireless signal 19 from the signal wire 18 when the sensor 24 is within a predetermined distance, such as distance D, from the signal wire 18 with the signal wire 18 placed at the boundary 20 between the nonhazardous area 22 and the hazardous area 12. The system 10 further includes at least one alerting device 30 operably associated with the sensor 24 to generate an alert to the person 28 carrying the sensor 24 in response to the sensor 24 sensing the wireless signal 19 from the signal wire 18. In the illustrated embodiment, the alerting device 30 is configured to be stationed at the worksite 14 so that its physical location is independent from the physical location and movements of the sensor 24.

In some embodiments, the system 10 can include a plurality of the portable sensors 24 for a plurality of people 28, as further shown in FIG. 1, with each of the portable sensors 24 being capable of sensing the wireless signal 19 from the signal wire 18 when the sensor 24 is within the predetermined distance from the signal wire 18 with the signal wire 18 placed between the nonhazardous area 22 and the hazardous area 12 at the worksite 14.

Those skilled in the art will appreciate that there are many known transmitters, signal wires, and sensors that can be utilized for the components 16, 18, and 24 in the system 10. Those skilled in the art will also understand that the desired predetermined distance D from the signal wire 18 at which the sensor 24 will sense the wireless signal 19 and activate the alerting device 30 may vary depending upon the particular type of worksite 14 and the particular type of hazardous area 12 at the worksite 14 and, further, that the predetermined distance D can depend upon a number of parameters, including, for example, the wavelength of the wireless signal 19, the strength of the wireless signal 19, and the detection threshold of the sensor 24, all of which can be selected or varied by a user to adjust the predetermined distance D to achieve the desired result.

With reference to FIG. 2, the sensor 24 (or each wireless sensor 24 if there are a plurality) will typically include a wireless receiver 32 that is configured to detect or sense the wireless signal 19 from the signal wire 18 when the wireless receiver 32 is within the predetermined distance from the signal wire 18. In some embodiments of the system 10, the sensor 24 will also include a transmitter 34 that is configured to transmit a wireless alert signal (shown schematically at 36) to the alerting device(s) 30 in response to the wireless receiver 32 sensing the wireless signal 19 from the signal wire 18, and the alerting device 30 will typically include a wireless receiver 38 configured to sense the wireless alert signal 36 from the sensor 24 to activate the alerting device 30. Those skilled in the art will understand that, although not shown, the sensor 24 and alerting device 30 will each also typically include other components, such as, for example, a programmable processor in the form of a micro-controller and a power source in the form of a battery, to enable the operation of the other components of the sensor 24 and the alerting device 30.

As shown in FIG. 1, in some embodiments, the alerting device 30 can be provided in the form of a self retracting lifeline (SLR) 30A that is anchored at the worksite 14 physically independent of the sensor(s) 24, with a lifeline 40 attached to the body 26 of a person 28 at the worksite 14. The self retracting lifeline 30A is configured to resist further deployment of the lifeline 40 in response to the sensor 24 sensing the wireless signal 19 from the signal wire 18 when the sensor 24 is within the predetermined distance D from the signal wire 18. In embodiments having a plurality of the sensors 24, each of the sensors 24 could have an individual self retracting lifeline 30A associated with that specific sensor 24 so that the individual self retracting lifeline 30A is only responsive to that specific sensor 24. There are many known self retracting lifelines and those skilled in the art will understand that known self retracting lifelines can be modified in various ways using known components to activate their braking system to resist deployment of their lifeline in response to the sensor 24 sensing the wireless signal 19 from the signal wire 18. Accordingly, the specific details of any particular self retracting lifeline 30A are not critical to understanding the system 10.

In some embodiments, the alerting device 30 can be provided in the form of a barrier, shown diagrammatically at 30B in FIG. 1, that is automatically movable from a stored position allowing intrusion into the hazardous area 12 to a deployed position inhibiting intrusion into the hazardous area 12 in response to any of the sensors 24 sensing the wireless signal from the signal wire 18 when any of the sensors 24 are within the predetermined distance from the signal wire 18. Those skilled in the art will appreciate that there are many possible types and constructions for a deployable barrier 30B that can be used in the system 10, that the specific type/construction of the barrier 30B will be dependent upon the details of the specific worksite 14 and hazardous area 12 in which the barrier 30B will be deployed, and, accordingly, that the specific details of a specific type/construction of the barrier 30B are not critical to understanding the system 10.

In some embodiments, the alerting device 30 can be provided in the form of warning lights, shown schematically at 30C in FIG. 1, that are configured to be stationed between the non-hazardous area 22 and the hazardous area 12 and to illuminate in response to any of the sensors 24 sensing the wireless signal 19 from the signal wire 18 when the sensor 24 is within the predetermined distance D from the signal wire 18. Again, those skilled in the art will appreciate that there are many known types and constructions of warning lights that can be configured for use in the system 10, that the specific type/construction will be dependent upon the details of each worksite 14 and associated hazardous area 12, and, accordingly, that the specific details of a specific type/construction of warning lights 30C are not critical to understanding the system 10.

In some embodiments, the alerting device 30 can be configured to generate an audio signal (such as a siren or a verbal warning), a visual signal (such as a strobe or flashing light), or a tactile signal (such as a vibration) in response to any of the sensors 24 sensing the wireless signal from the signal wire 18 when the sensor is within a predetermined distance from the signal wire 18. Again, those skilled in the art will understand that there are many possible configurations for generating audio, visual, and/or tactile, signals, that the specific configuration for any particular application of the system 10 will be dependent many factors specific to each particular application, and, accordingly, the details of any specific configuration for generating an audio, visual, and/or tactile signal are not critical to understanding the system 10.

It should be appreciated that in some embodiments only one alerting device 30 will be provided at a worksite 14 and that the alerting device 30 will be configured to be responsive to all of the sensors 24 at the worksite 24, while in other embodiments several of the alerting devices 30 can be provided at a worksite 14 with some or all of the altering devices 30 being responsive to all of the sensors 24 at the worksite and/or some or all of the alerting devices 30 being responsive to a single corresponding one of the sensors 24. For example, in some embodiments of the system 10 it may be desirable to provide a worksite 14 with a barrier 30B and warning lights 30C that are responsive to all of the sensors 24 at the worksite 14, while also providing individual self retracting lifelines 30A for some or all of the people 28 at the worksite 14, with each of the individual self retracting lifelines 30A being responsive only to the sensor 24 carried on the body 26 of the person 28 using the individual self retracting lifeline 30A.

It should be understood that while specific forms and specific examples of the system 10 are shown and described herein, there are many possible variation within the scope of the application and that no limitation is intended unless expressly stated in one of the appended claims. For example, while the sensors 24 are illustrated as being positioned below the waist of the people 28, it should be understood that depending upon the requirements of each particular worksite 14 and the design of each sensor 24, it may be desirable for the sensors 24 to be positioned at any other location on the body 26 of a person 28. As a further example, while all of the previously described alerting devices 30 have been configured to be stationed at a worksite 14 independent of the physical location and movements of the sensors 24, in some embodiments it may be desirable for one or more alerting devices 30 to be operably associated with each of the sensors 24 at a worksite 14 for movement with the sensor 24 about the worksite 14.

The invention claimed is:

1. A method for preventing accidental intrusions into a hazardous area at a worksite, the method comprising the steps of:
    placing a signal wire between a non-hazardous area and a hazardous area at a worksite;
    sensing a signal from the signal wire with a wireless receiver carried on a person at the worksite when the wireless receiver is within a predetermined distance from the signal wire; and
    automatically alerting the person that they are about to intrude into the hazardous area in response to the signal sensed by the wireless receiver.

2. The method of claim 1 wherein the step of automatically alerting the person comprises restraining the person against further movement toward the hazardous area.

3. The method of claim 1 wherein the step of automatically alerting the person comprises generating an audio signal to the person.

4. The method of claim 1 wherein the step of automatically alerting the person comprises generating a tactile signal to the person.

5. The method of claim 1 wherein the step of automatically alerting the person comprises generating a visual signal to the person.

6. The method of claim 5 wherein the step of generating a visual signal comprises illuminating warning lights positioned between the non-hazardous area and the hazardous area.

7. The method of claim 1 wherein the automatically alerting step comprises generating a wireless alert signal to a fixed position alerting device responsive to the wireless alert signal.

8. The method of claim 1 further comprising the step of providing a wireless receiver to each person at the worksite, each of the wireless receivers capable of sensing a signal from the signal wire when the wireless receiver is within a predetermined distance from the signal wire.

9. A method for preventing accidental intrusions into a hazardous area at a worksite the method comprising the steps of:
    placing a signal wire between a non-hazardous area and a hazardous area at a worksite;
    sensing a signal from the signal wire with a wireless receiver carried on a person at the worksite when the wireless receiver is within a redetermined distance from the signal wire;
    automatically alerting the person that they are about to intrude into the hazardous area in response to the signal sensed by the wireless receiver;
    wherein the step of automatically alerting the person comprises restraining the person against further movement toward the hazardous area; and
    wherein the restraining step comprises automatically activating a self retracting lifeline to resist further deployment a lifeline attached to the person.

10. A method for preventing accidental intrusions into a hazardous area at a worksite, the method comprising the steps of:
    placing a signal wire between a non-hazardous area and a hazardous area at a worksite;

sensing a signal from the signal wire with a wireless receiver carried on a person at the worksite when the wireless receiver is within a predetermined distance from the signal wire;

automatically alerting the person that they are about to intrude into the hazardous area in response to the signal sensed by the wireless receiver;

wherein the step of automatically alerting the person comprises restraining the person against further movement toward the hazardous area; and wherein the restraining step comprises automatically raising a barrier between the non-hazardous area and the hazardous area.

11. A system for preventing accidental intrusions into a hazardous area, the system comprising:

a transmitter;

a signal wire connectable to the transmitter to emit a wireless signal driven by the transmitter, the signal wire configured for placement between a non-hazardous area and a hazardous area at a worksite;

a portable sensors configured to be carried on the body of a person at the worksite and to sense the wireless signal from the signal wire when the sensor is within a predetermined distance from the signal wire with the signal wire placed between a non-hazardous area and a hazardous area at a worksite; and an alerting device operably associated with the sensor to automatically generate an alert to a person carrying the sensor in response to the sensor sensing the wireless signal from the signal wire when the sensor is within a predetermined distance from the signal wire with the signal wire placed between a non-hazardous area and a hazardous area at a worksite, the alerting device configured to be positioned at the worksite independent from the sensor.

12. The system of claim 11 further comprising a plurality of portable sensors, each sensor capable of sensing the wireless signal from the signal wire when the sensor is within a predetermined distance from the signal wire with the signal wire placed between a non-hazardous area and a hazardous area at a worksite; each sensor configured to be carried on the body of a person at the worksite; and wherein the alerting device is operably associated with each of the sensors to generate an alert to any person carrying one of the sensors in response to the sensor sensing the wireless signal from the signal wire when the sensor is within a predetermined distance from the signal wire with the signal wire placed between a non-hazardous area and a hazardous area at a worksite.

13. The system of claim 11the portable sensor comprises a wireless receiver configured to sense the wireless signal from the signal wire when the sensor is within a predetermined distance from the signal wire with the signal wire placed between a non-hazardous area and a hazardous area at a worksite.

14. The system of claim 13 wherein the sensor further comprises a wireless transmitter configured to transmit a wireless alert signal in response to the wireless receiver sensing the wireless signal from the signal wire when the sensor is within a predetermined distance from the signal wire with the signal wire placed between a non-hazardous area and a hazardous area at a worksite and wherein the alerting device comprises a wireless receiver configured to sense the wireless alert signal from the sensor.

15. The system of claim 11 wherein the alerting device comprises warning lights configured to be stationed between the non-hazardous area and the hazardous area and to illuminate in response to any of the sensors sensing the wireless signal from the signal wire when the sensor is within a predetermined distance from the signal wire with the signal wire placed between a non-hazardous area and a hazardous area at a worksite.

16. The system of claim 11 wherein the alerting device is configured to generate an audio signal in response to any of the sensors sensing the wireless signal from the signal wire when the sensor is within a predetermined distance from the signal wire with the signal wire placed between a non-hazardous area and a hazardous area at a worksite.

17. The system of claim 11 wherein the alerting device is configured to generate a visual signal in response to any of the sensors sensing the wireless signal from the signal wire when the sensor is within a predetermined distance from the signal wire with the signal wire placed between a non-hazardous area and a hazardous area at a worksite.

18. The system of claim 11 wherein the alerting device is configured to generate an tactile signal in response to any of the sensors sensing the wireless signal from the signal wire when the sensor is within a predetermined distance from the signal wire with the signal wire placed between a non-hazardous area and a hazardous area at a worksite.

19. A system for preventing accidental intrusions into a hazardous area, the system comprising:

a transmitter, a signal wire connectable to the transmitter to emit a wireless signal driven by the transmitter, the signal wire configured for placement between a non-hazardous area and a hazardous area at a worksite;

a portable sensors configured to be carried on the body of a person at the worksite and to sense the wireless signal from the signal wire when the sensor is within a predetermined distance from the signal wire with the signal wire placed between a non-hazardous area and a hazardous area at a worksite;

an alerting device operably associated with the sensor to automatically generate an alert to a person carrying the sensor in response to the sensor sensing the wireless signal from the signal wire when the sensor is within a predetermined distance from the signal wire with the signal wire placed between a non-hazardous area and a hazardous area at a worksite, the alerting device configured to be positioned at the worksite independent from the sensor; and wherein the alerting device comprises a self retracting lifeline configured to resist further deployment of a lifeline in response to the sensor sensing the wireless signal from the signal wire when the sensor is within a predetermined distance from the signal wire with the signal wire placed between a non-hazardous area and a hazardous area at a worksite, 20. A system for preventing accidental intrusions into a hazardous area, the system comprising:

a transmitter;

a signal wire connectable to the transmitter to emit a wireless signal driven b the transmitter, the signal wire configured for placement between a non-hazardous area and a hazardous area at a worksite;

a portable sensors configured to be carried on the body of a person at the worksite and to sense the wireless signal from the signal wire when the sensor is within a predetermined distance from the signal wire with the signal wire placed between a non-hazardous area and a hazardous area at a worksite;

an alerting device operably associated with the sensor to automatically generate an alert to a person carrying the sensor in response to the sensor sensing the wireless signal from the signal wire when the sensor is within a predetermined distance from the signal wire with the signal wire placed between a non-hazardous area and a hazardous area at a worksite, the alerting device configured to be positioned at the worksite independent from the sensor; and wherein the alerting device comprises a barrier movable from a position allowing intrusion into the hazardous area to a position inhibiting intrusion into the hazardous area in response to any of the sensors sensing the wireless signal from the signal wire when the sensor is within a predetermined distance from the signal wire with the signal wire placed between a non-hazardous area and a hazardous area at a worksite.

* * * * *